United States Patent Office.

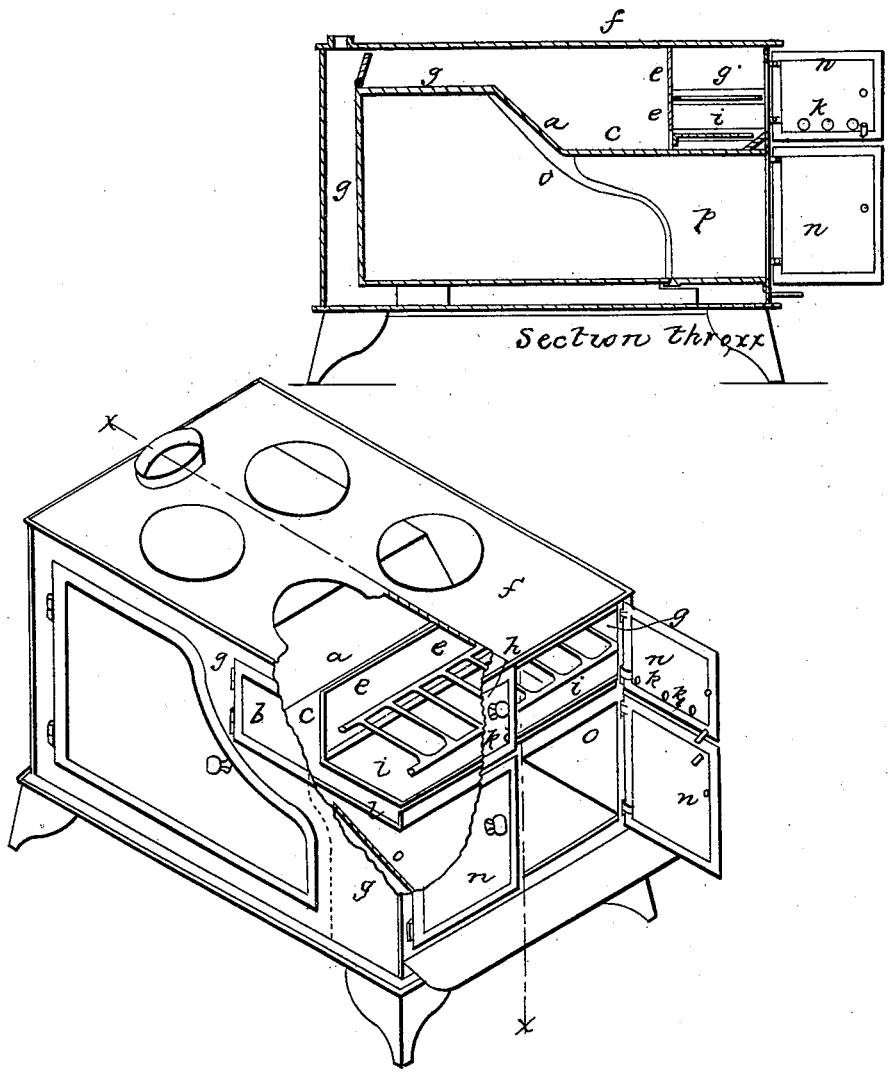

IMPROVEMENT IN COOKING STOVES.

GEO. W. WALKER, OF BOSTON, MASSACHUSETTS.

Letters Patent No. 60,446, dated December 11, 1866.

*The Schedule referred to in these Letters Patent and making part of the same.*

TO ALL WHOM IT MAY CONCERN:

Be it known that I, GEORGE W. WALKER, of Boston, in the county of Suffolk, and State of Massachusetts, have invented an Improvement in Cooking Stoves; and I do hereby declare that the following, taken in connection with the drawings which accompany and form part of this specification, is a description of my invention sufficient to enable those skilled in the art to practise it.

This invention relates principally to that class of square cooking stoves known as high hearth stoves, in which an ash-pit projects from the front of the stove, and the object of my invention is the utilization of the space above and beneath this ash-pit for cooking purposes, and by such utilization to give the stove the compact square form it would possess without the projecting ash-pit. The oven is extended below the projecting ash-pit to the front side thereof to utilize the space below the same, while the space above is made into a hot air closet, and it is the construction effecting these results which constitutes the invention.

The drawing represents an elevation in isometrical perspective of a wood stove embodying the invention, one corner of the same being shown as so broken away as to exhibit the interior construction.

$a$ denotes the fire pot or fuel chamber, the wood being introduced at a door, $b$, placed at either or both ends thereof, and burned directly on the bottom plate, $c$, or upon a grate placed thereon. The ash-pit opens out of and extends from the bottom of the fuel chamber. A wall, $e$, forms the front of the fuel chamber, and as stoves are usually made, this wall (or doors placed therein) forms the upper part of the front of the stove, a wall below the ash-pit in the same vertical line with $e$, forming the lower part of the front, the ash-pit being a projection therefrom. Instead of such construction, I extend the top plate, $f$, and the side walls, $g$, out to the same distance that the ash-pit projects, and place doors, $h$, in front of the same, the top plate, $i$, of the ash-pit, the extensions of the top plate, $f$, and walls, $g$, and the doors, $h$, thus forming a hot air closet, heated by the front wall of the fire pot and the heat from the ash pit, and serving to contain dishes to be kept warm, and for other similar purposes, as will be readily understood. The plate, $i$, is made as a slide, and to remove the ashes we draw the plate out, which allows free access to the fuel chamber through the ash-pit. By removing the slide and drawing live coals from the fuel chamber into the ash-pit, the closet may be used to broil meat, the gridiron being introduced over the coals and the doors, $h$, closed, draught openings, $k$, through the doors, serving to cause the smoke to be driven through the ash-pit into the fire-pot, and thence into and through the stove flues, and preventing all escape of unpleasant odors into the room, as in the common methods of broiling. Instead of having a wall below the ash-pit in line with the wall, $e$, I extend the oven space out under the ash-pit, as seen in the drawing, the bottom plate, $l$, of the ash-pit, the extensions of the side walls and bottom plate of the stove, with doors, $n$, inclosing this space, the doors, $n$, opening directly at the front of the stove, and the extended oven space being heated by carrying the flues at the bottom of the oven out to the front of the stove. Side hot air boxes, $o$, are extended up from these flues to increase the heat radiating surface in the oven. It will be obvious that besides this material increase in the size of the oven, the arrangement of the doors, $n$, is a very advantageous one as a means of access to the front of the oven. It will be seen that practically this construction occupies no more space than the old stove, as the extensions to form the hot air closet above and the oven space below the ash-pit are only to the front of the projecting ash-pit of the old arrangement, while the construction which effects these advantages improves the appearance and enhances the conveniences of the stove. The capacity of the ash-pit for containing ashes is only limited by the capacity of the hot air closet above it, for it will be evident that by withdrawing the slide, $i$, the ashes may be drawn from the fuel chamber into and so as to fill to any extent the hot air closet. By this means I am enabled to obtain great height for the oven space below the ash-pit and convenient access to the oven through the openings in front, this being obviously impracticable where the ash-pit drops below a hearth, as in the ordinary construction.

In the construction of stove herein shown and described, the increased size of the oven calls for increased facilities for getting at its interior; besides the doors in the front of the oven, I retain the ordinary side doors. But this number of large openings weakens the stove by removal of a large portion of its permanent wall, hence in connection with the extended oven, arranged and having its doors as described, I make, for the purpose of strengthening the stove, and also for the purpose of heating the oven, the walls thereof double on each side adjacent to the front oven doors and extending nearly to the side doors of the oven, said walls bounding spaces which communicate with the flue of the stove and become charged with heat therefrom, which contributes to the heating of the oven. I do not intend herein to claim broadly a stove construction having an oven with doors opening at its front and with flues at the sides, as this has already an existence. This part of my invention consists in so constructing a stove that when access is had to its oven through front and side doors its strength of structure shall be preserved by making the walls of the stove on each side and between the front and the side doors, double, and so as to constitute chambers communicating with the flue beneath, from which they become charged with heated air.

I claim the construction, substantially as shown and described, by which the space above the ordinary high hearth or ash-pit of the fire box of the common form of cooking stove is utilized for the purposes specified, said construction consisting of the extension of the top and sides of the stove over and to the front of said hearth or ash-pit, when provided with doors, which inclose the space and retain the heat therein while capable of being opened for the various purposes connected with the utilization of said space; also, in combination with such an inclosed space over the aforesaid hearth or ash-pit, of the inclosure of the space below the same, so as thereby to increase the capacity of the oven of the stove, substantially as described; and I also claim in a cooking stove the arrangement of the oven with side and front doors and double walls or plates on either side, and at the front of the oven, between the front and side doors thereof, when the spaces inclosed between said double walls open into the lower flue so as to become charged with heated air, and thus heating the oven as well as affording the strength needed in the structure of the stove.

GEO. W. WALKER.

Witnesses:
   E. FONTARIVE,
   CHAS. H. PRENTISS.